(12) United States Patent
Cislo

(10) Patent No.: US 7,775,162 B1
(45) Date of Patent: Aug. 17, 2010

(54) ROLLER FOR TROLLEY ASSEMBLY

(76) Inventor: Lawrence Cislo, 2713 Hartun Dr., Brighton, MI (US) 48114-7561

( * ) Notice: Subject to any disclaimer, the term of this patent is extended or adjusted under 35 U.S.C. 154(b) by 246 days.

(21) Appl. No.: 11/890,703

(22) Filed: Aug. 7, 2007

Related U.S. Application Data

(60) Provisional application No. 60/835,990, filed on Aug. 7, 2006.

(51) Int. Cl.
*B61B 3/00* (2006.01)

(52) U.S. Cl. ...................................... 105/154

(58) Field of Classification Search ................ 384/211, 384/212; 104/89, 93–95; 105/148, 150, 105/154, 155; 16/91; 193/37
See application file for complete search history.

(56) References Cited

U.S. PATENT DOCUMENTS

| | | | | |
|---|---|---|---|---|
| 1,748,198 A * | 2/1930 | Van Wormer | ................ | 301/1 |
| 2,250,167 A * | 7/1941 | Niles et al. | ................ | 105/154 |
| 2,780,178 A * | 2/1957 | Zebley | ................ | 105/148 |
| 3,469,892 A * | 9/1969 | Langstroth | ................ | 384/18 |
| 3,888,554 A * | 6/1975 | McCloskey | ................ | 384/212 |
| 3,893,736 A * | 7/1975 | McCloskey | ................ | 384/212 |
| 3,915,518 A * | 10/1975 | McCloskey | ................ | 384/212 |
| 3,971,601 A * | 7/1976 | Sytsma | ................ | 384/492 |
| 3,989,321 A * | 11/1976 | McCloskey | ................ | 384/211 |
| 4,077,681 A * | 3/1978 | McCloskey | ................ | 384/211 |
| 4,178,856 A * | 12/1979 | Dunville | ................ | 104/95 |
| 4,265,181 A * | 5/1981 | Schreyer et al. | ................ | 105/150 |
| 4,395,142 A * | 7/1983 | Lobeck | ................ | 384/192 |
| 4,433,627 A * | 2/1984 | Forshee | ................ | 104/95 |
| 4,484,525 A * | 11/1984 | Forshee et al. | ................ | 104/95 |
| 5,156,533 A * | 10/1992 | Hoffman et al. | ................ | 105/148 |
| 5,219,231 A * | 6/1993 | Sheedy | ................ | 384/206 |
| 5,277,126 A * | 1/1994 | Wendt et al. | ................ | 105/155 |
| 5,357,868 A * | 10/1994 | Maas | ................ | 105/180 |
| 5,398,618 A * | 3/1995 | McMullen | ................ | 105/148 |
| 6,494,622 B2 * | 12/2002 | Plesh, Sr. | ................ | 384/542 |
| 6,536,077 B1 * | 3/2003 | Espey | ................ | 16/91 |
| 6,880,469 B2 * | 4/2005 | Frost | ................ | 105/154 |
| 6,948,433 B2 * | 9/2005 | Hoffmann et al. | ................ | 105/148 |
| 7,341,138 B1 * | 3/2008 | Wendt et al. | ................ | 193/35 R |
| 2003/0101895 A1 * | 6/2003 | Hoffmann et al. | ................ | 104/95 |
| 2007/0289091 A1 * | 12/2007 | Espey | ................ | 16/91 |
| 2009/0028482 A1 * | 1/2009 | Iwata et al. | ................ | 384/429 |
| 2009/0044719 A1 * | 2/2009 | Schmidt et al. | ................ | 105/148 |

* cited by examiner

*Primary Examiner*—S. Joseph Morano
*Assistant Examiner*—Jason C Smith
(74) *Attorney, Agent, or Firm*—Bliss McGlynn, P.C.

(57) ABSTRACT

A roller for a trolley assembly, which includes at least one track and at least one pin adapted to carry a hanger, includes, in one embodiment thereof, a bearing substantially split to define at least two independent parts of the split bearing. A housing rollingly engages along the at least one track and houses the bearing. A bushing is housed within the housing, carries the pin, supports the bearing about the bushing, and defines at least one shoulder adapted to substantially positively abuttingly engage the at least two parts of the bearing to substantially prevent rotation of the bearing about the bushing during rolling of the housing along the at least one track.

16 Claims, 4 Drawing Sheets

ROLLER FOR TROLLEY ASSEMBLY

CROSS-REFERENCE TO RELATED APPLICATION

This application claims benefit of U.S. Provisional Patent Application 60/835,990 entitled "Roller for Trolley Assembly" and filed on Aug. 7, 2006.

BACKGROUND OF THE INVENTION

1. Field of the Invention

The invention relates, generally, to a trolley assembly and, more particularly, to a roller of such an assembly.

2. Description of Related Art

In each of various manufacturing and warehouse facilities, such as those found in the food-processing or -service, materials-handling, and automotive industries, it is common practice to use a conveyor system that employs a trolley assembly for moving a load between spaced points within the facility. To this end, the trolley assembly typically includes a beam supported overhead. The beam defines an "I" cross-section to define a pair of spaced, identical, opposed, uniform tracks that are disposed parallel with each other. A pair of identical, substantially disc-shaped rollers are rollably guided on the respective tracks. Each of a pair of identical, uniform shafts is positioned within the respective roller such that a free end of the shaft projects horizontally out and is carried by the roller. A pair of identical hangers are carried by and depend downwardly from the free ends of the respective shafts. Each load is generally suspended from and carried by the hangers. In turn, each roller includes at least a housing and a bearing.

More specifically, the housing generally is solid steel and disk-shaped. The housing is also adapted for rolling engagement with a corresponding track and to house the entire bearing. The bearing generally is solid steel, cylindrical, hollow, and disposed within an interior of the housing and may have a rolling or ball element such that, during operation of the trolley assembly, as the housing rolls along the respective track, displacement of the housing relative to the bearing should take place.

The shaft is adapted to be press-fitted, slip-fitted, or otherwise matingly fitted within the bearing such that a free end of the shaft projects out and is carried by the housing. In this way, during operation of the trolley assembly, as the housing rolls along the respective track, the housing should rotate about the shaft, and no displacement of the bearing relative to the shaft should take place.

Each hanger generally is made of steel or other suitable material and includes a cylindrical upper portion defining an aperture therethrough for matingly receiving the free end of the respective shaft. A nut is tightened onto the free end of the shaft to clamp the upper portion between the nut and the housing. The hanger includes also a linear intermediate portion extending downwardly from the bottom of the upper portion such that the intermediate portions angle inwardly toward one another. The hanger includes also a linear lower portion extending downwardly from the bottom of the intermediate portion such that the lower portions are disposed spaced and parallel with each other. At least one carrier plate is sandwiched between and extends downwardly from the lower portions. The lower portions and at least one carrier plate are clampingly connected together by at least one bolt-and-nut combination. An aperture is defined through a free end of the at least one carrier plate for receipt thereby of a hook member or the like for use thereby in transporting the load.

A split half of a link of a conveyor chain is positioned in a notch defined in the lower portion of each hanger to embrace and drivingly engage the hanger. Powered movement of the chain in a known manner serves to move the trolley assembly along the track to move the load carried by the at least one carrier plate from point to point within the facility.

It should be appreciated by those having ordinary skill in the related art that the trolley assembly, in general, and roller thereof, in particular, just described are merely respective representative examples of a typical trolley assembly and roller thereof of the related art. It should be so appreciated also that each of such trolley assembly, in general, and roller thereof, in particular, can have any suitable structural design.

Although the trolley assembly of the related art moves the load from point to point within the warehousing or manufacturing facility, the roller tends to prematurely fail. More specifically, the cross-section defined by the housing can change with respect to that of the bearing via, for instance, the constant downward force applied by the load to the roller over time. This moment load can cause uneven wear of the bearing relative to the housing. Furthermore, the roller of the trolley assembly of the related art is not cost-effective to manufacture. In addition, the roller of the trolley assembly of the related art that is made of a material other than steel, e.g., plastic, can be structurally weak.

Moreover, in the food-processing or service industry, in particular, poultry trolley assemblies are used to move poultry between spaced points within a facility. In doing so, they are continually bombarded with high-pressure streams of water and/or solvents to clean the assemblies of unwanted poultry residue for health-safety reasons. In a heavy water environment such as this, the rollers need to be easier to clean and resistant to contamination and corrosion.

Thus, there is a need in the related art for a roller for a trolley assembly that does not tend to prematurely fail. More specifically, there is a need in the related art for a roller for a trolley assembly the housing of which does not unevenly wear with respect to the bearing during operation of the trolley assembly. There is a need in the related art for a roller for a trolley assembly that also is cost-effective to manufacture. There is a need in the related art for a roller for a trolley assembly that also is durable. There is a need in the related art for a roller for a trolley assembly that also is easier to clean and resistant to contamination and corrosion, especially for use in the food-processing or service industry.

SUMMARY OF THE INVENTION

The invention overcomes the problems in the related art in a roller for a trolley assembly including at least one track and at least one pin adapted to carry a hanger. In one embodiment of the roller, the roller includes a bearing substantially split to define at least two independent parts of the split bearing. A housing rollingly engages along the at least one track and houses the bearing. A bushing is housed within the housing, carries the pin, supports the bearing about the bushing, and defines at least one shoulder adapted to substantially positively abuttingly engage the at least two parts of the bearing to substantially prevent rotation of the bearing about the bushing during rolling of the housing along the at least one track.

An advantage of the roller for a trolley assembly of the invention is that it does not tend to prematurely fail.

Another advantage of the roller for a trolley assembly of the invention is that the housing does not unevenly wear with respect to the bearing during operation of the trolley assembly.

Another advantage of the roller for a trolley assembly of the invention is that it can be manufactured more cheaply and easily and, thus, more cost-effectively relative to the trolley assemblies of the related art.

Another advantage of the roller for a trolley assembly of the invention is that it is more durable relative to the trolley assemblies of the related art.

Another advantage of the roller for a trolley assembly of the invention is that it better distributes load to parts of the roller relative to the trolley assemblies of the related art.

Another advantage of the roller for a trolley assembly of the invention is that it is easier to clean relative to the trolley assemblies of the related art.

Another advantage of the roller for a trolley assembly of the invention is that it is more resistant to contamination relative to the trolley assemblies of the related art.

Another advantage of the roller for a trolley assembly of the invention is that it is more resistant to corrosion relative to the trolley assemblies of the related art.

Another advantage of the roller for a trolley assembly of the invention is that it can find special application in a heavy-water/heavy-solvent environment, especially in the food-processing or -service industry.

Another advantage of the roller for a trolley assembly of the invention is that it is lighter relative to the trolley assemblies of the related art.

Another advantage of the roller for a trolley assembly of the invention is that it can be used in connection with an existing hanger of the trolley assembly.

Another advantage of the roller for a trolley assembly of the invention is that it can be readily made from plastic materials that are cost-effective and corrosion-resistant and provide for a lower amount of friction and wear relative to the trolley assemblies of the related art.

Other objects, features, and advantages of the roller for a trolley assembly of the invention will be readily appreciated as the same becomes better understood while reading the subsequent description taken in conjunction with the accompanying drawing.

BRIEF DESCRIPTION OF EACH FIGURE OF THE DRAWING

DETAILED DESCRIPTION OF EMBODIMENTS OF THE INVENTION

Figure 1:
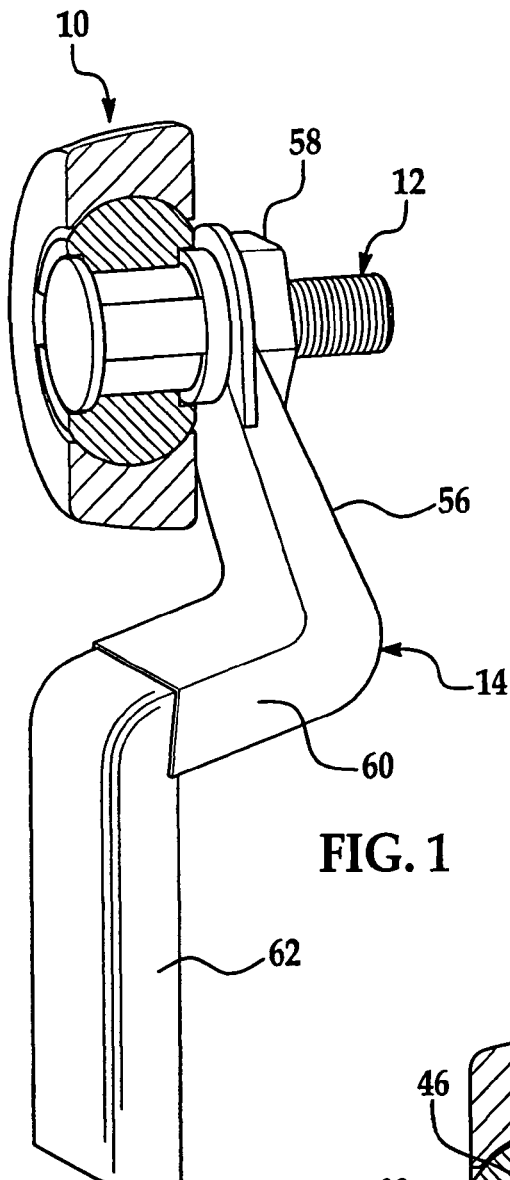
FIG. 1 is a partial environmental view of a first embodiment of the roller for a trolley assembly of the invention with each of the housing and bearing thereof viewed in cross-section.
Figure 2:
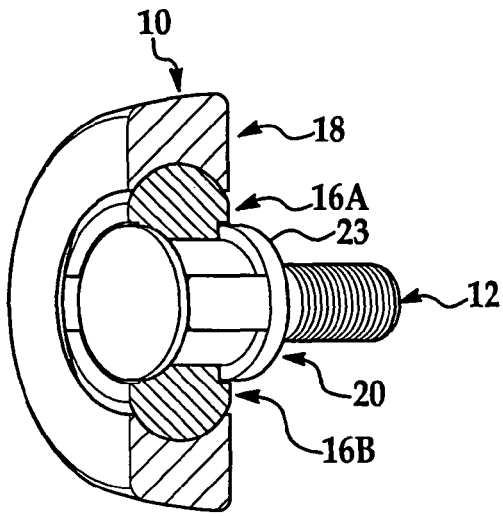
FIG. 2 is a perspective view of the embodiment of the roller for a trolley assembly of the invention illustrated in FIG. 1 with each of the housing and bearing thereof viewed in cross-section.

A roller for a trolley assembly according to the invention is generally indicated at 10, 110 in FIGS. 1 through 11, where like numerals are used to designate like structure throughout the various embodiments of the roller 10, 110 disclosed herein. Although the roller 10, 110 is designed to be used in connection with the known trolley assembly described above, those having ordinary skill in the related art should appreciate that the roller 10, 110 can be used in connection with any suitable trolley assembly including at least one track (not shown) and at least one pin, generally indicated at 12, adapted to carry a hanger, generally indicated at 14, as shown in FIG. 1. The details of each roller 10, 110 are described below with reference to FIGS. 1-6 and 7-11, respectively.

Figure 4:
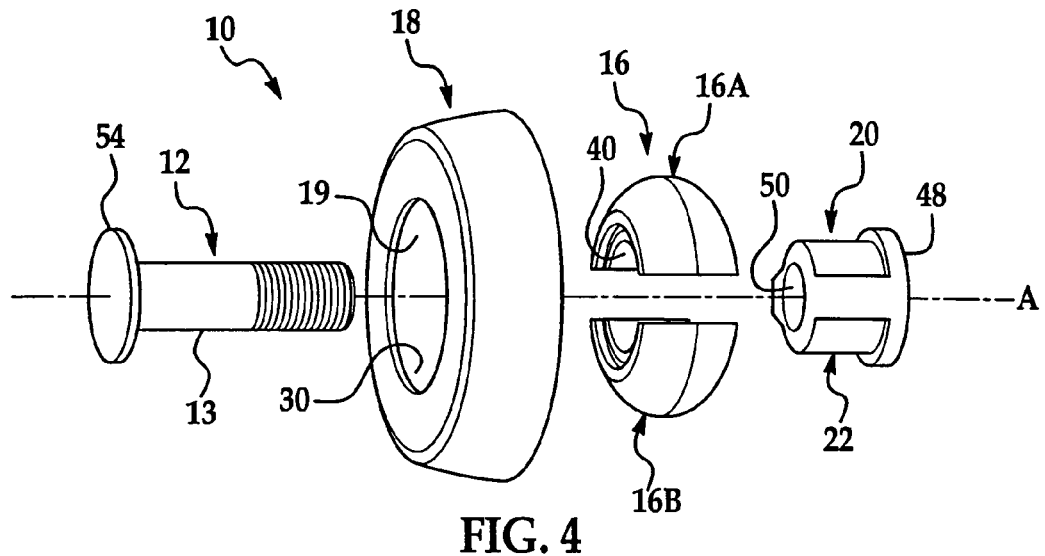
FIG. 4 is an exploded side view of the embodiment of the roller for a trolley assembly of the invention illustrated in FIG. 1.
Figure 5:
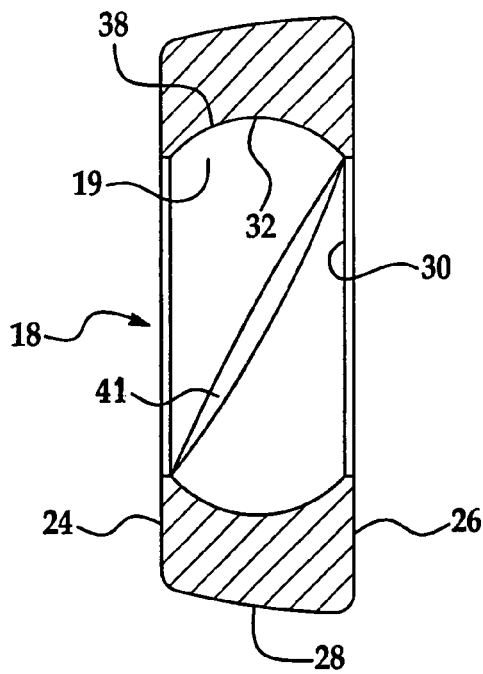
FIG. 5 is a cross-sectional side view of the housing of the embodiment of the roller for a trolley assembly of the invention illustrated in FIG. 1.
Figure 6:
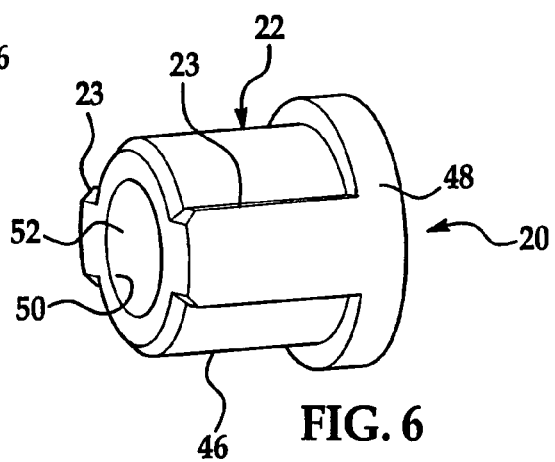
FIG. 6 is a perspective view of the bushing of the embodiment of the roller for a trolley assembly of the invention illustrated in FIG. 1.
Figure 10:
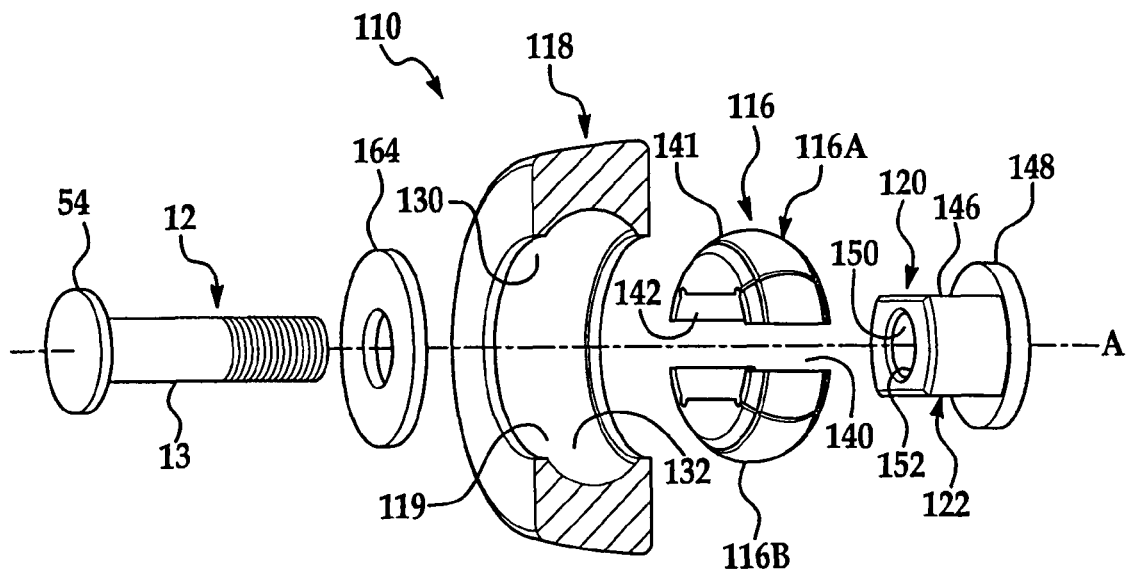
FIG. 10 is an exploded side view of the embodiment of the roller for a trolley assembly of the invention illustrated in FIG. 7 with the housing thereof viewed in cross-section.

In general, the roller 10, 110 includes a bearing, generally indicated at 16, 116 in FIGS. 4 and 10, respectively, substantially split to define at least two independent parts, generally indicated at 16A, 16B, 116A, 116B, respectively, of the split bearing 16, 116. A housing, generally indicated at 18, 118, is adapted for rolling engagement along the track and to house the bearing 16, 116. A bushing, generally indicated at 20, 120, is adapted to be housed within the housing 18, 118, carry the pin 12, and support the bearing 16, 116 about the bushing 20, 120. The bushing 20, 120 is adapted to also substantially positively abuttingly engage the parts 16A, 16B, 116A, 116B of the bearing 16, 116, respectively, to substantially prevent rotation of the bearing 16, 116 about the bushing 20, 120 during rolling of the housing 18, 118 along the track. Also, the pin 12 is adapted to be matingly received within the bushing 20, 120 such that operative displacement among the bearing 16, 116, bushing 20, 120, and pin 12 relative to each other is substantially prevented, and the housing 18, 118 is rotatable relative to the bearing 16, 116 and, thus, bushing 20, 120 and pin 12.

More specifically, the bearing 16, 116 defines a relatively oversized, arcuate transverse cross-section. The housing 18, 118 is substantially disk-shaped to define a pair of opposed and substantially planar, smooth, circular faces 24, 26, 124, 126, respectively shown in FIGS. 3 and 9, that are spaced substantially parallel with each other. A substantially smooth outer circumferential surface 28, 128 is defined also integrally with and between and about the faces 24, 26, 124, 126 to define a thickness of the housing 18, 118 and adapted for rolling engagement along the track. The outer circumferential surface 28, 128 tapers slightly, either arcuately or linearly, from face 26, 126 to face 24, 124 such that face 26, 126 defines a greater diameter than that of face 24, 124. Face 24, 124 defines a minimum diameter of the housing 18, 118, and face 26, 126 defines a maximum diameter of the housing 18, 118. The edges joining the outer circumferential surface 28, 128 and the respective faces 24, 26, 124, 126 can be either arcuate or linear. The housing 18, 118 also includes a race 19, 119, shown in FIGS. 4-5 and 10-11, respectively, adapted to nestingly receive the bearing 16, 116.

The housing 18, 118 defines also a rotational axis "A," as shown in FIGS. 4 and 10, respectively, extending through the substantial center of the faces 24, 26, 124, 126. The housing 18, 118 defines also a bore 30, 130 defining a substantially circular transverse cross-section and opening at a substantially central area of each face 24, 26, 124, 126. The bore 30, 130 extends entirely through the housing 18, 118 substantially concentric with the rotational axis "A" to define a substantially smooth, uniform inner circumferential surface 32, 132 of the housing 18, 118.

More specifically, the inner circumferential surface 32, 132 is substantially concave with respect to the rotational axis "A" and, in combination with the bore 30, 130, defines the race 19, 119, which is substantially uniform, for the bearing 16, 116. The race 19, 119 extends from nearly face 24, 124 to nearly face 26, 126 of the housing 18, 118, and the ends of the inner circumferential surface 32, 132 are substantially linear and perpendicular to the respective faces 24, 26, 124, 126. The shortest distance from the outer circumferential surface 28, 128 to the inner circumferential surface 32, 132 of the housing 18, 118 is substantially greater than the depth of the race 19, 119. The edges joining the inner circumferential surface 32, 132 and the respective faces 24, 26, 124, 126 can be either arcuate or linear. Preferably, the housing 18, 118 is made of engineered plastic, in general, and nylon, acetal resin, or ultra-high-molecular-weight polyethylene (UHMPE), in particular, to reduce the rate of operative wear between the bearing 16, 116 and housing 18, 118. Also preferably, the race 19, 119 is machined.

It should be appreciated by those having ordinary skill in the related art that the housing 18, 118 can have any suitable size, shape, and structure and structural relationship with the bearing 16, 116. It should be so appreciated also that each of the bore 30, 130 and race 19, 119 can have any suitable size and shape and structural relationship with the remainder of the housing 18, 118. It should be so appreciated also that the housing 18, 118 can be made from any suitable material, in general, and plastic, in particular. It should be so appreciated also that the race 19, 119 can be formed by any suitable method.

Thus, while there are two embodiments of the roller 10, 110 disclosed herein, those having ordinary skill in the related art should appreciate that other embodiments of the roller 10, 110 may be possible without departing from the scope of the invention. With this in mind, the various embodiments of the invention illustrated in the figures will be described in greater detail below.

Figure 3:
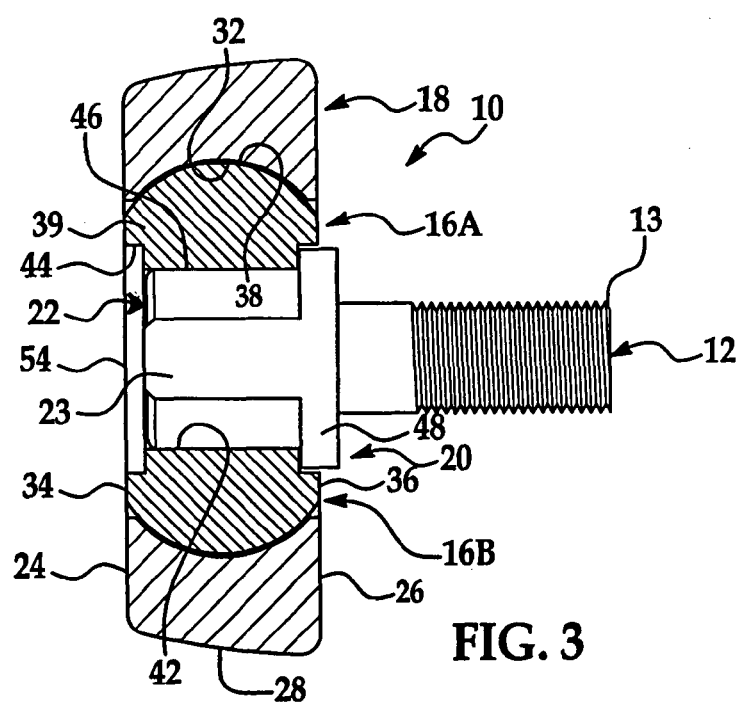
FIG. 3 is a side view of the embodiment of the roller for a trolley assembly of the invention illustrated in FIG. 1 with each of the housing and bearing thereof viewed in cross-section.

More specifically and referring now to FIGS. 1 through 6, structure of the roller 10 will be addressed. In this embodiment, the bearing 16 is substantially donut-shaped to define, as shown in FIG. 3, a pair of opposed and substantially identical ring-like faces 34, 36, respectively, that are spaced substantially parallel with each other. The faces 34, 36 are aligned substantially flush with the corresponding faces 24, 26 of the housing 18 and define a diameter of the faces 34, 36 smaller than or equal to that of the bore 30 of the housing 18. The bearing 16 defines also a substantially uniform, smooth, dome-shaped outer circumferential surface 38 disposed integrally with and between and about the faces 34, 36 of the bearing 16 to define a thickness of the bearing 16 smaller than or equal to that of the housing 18 such that the bearing 16 is housed completely within the bore 30 (including the race 19) of the housing 18.

More specifically, the transverse cross-section of the bearing 16 defines, as shown in FIG. 3, a substantially solid hemisphere 39 such that the outer circumferential surface 38 is convex with respect to the rotational axis "A" of the bearing 16. The hemisphere 39 extends from nearly face 34 to face 36 of the bearing 16 and is adapted to be nestingly received within the race 19, which defines at least one groove 41 adapted to receive and carry contamination resulting from use of the trolley assembly. The ends of the outer circumferential surface 38 are substantially linear and perpendicular to the respective faces 34, 36 of the bearing 16 and, thus, the respective faces 24, 26 of the housing 18 and are adapted to abut the corresponding ends of the inner circumferential surface 32 of the housing 18. The edges joining the outer circumferential surface 38 and the respective faces 34, 36 can be either arcuate or linear. The roller 10 can be designed such that the bearing 16 is slip- or clearance-fitted within or disposed integral with the interior of the housing 18 such that, during operation of the trolley assembly, as the housing 18 rolls along the track, the housing 18 moves relative to the bearing 16 and, thus, bushing 20 and pin 12.

To this end, the bearing 16 is adapted to be pinched to ease assembly of the bearing 16 within the interior of the housing 18. However, those having ordinary skill in the related art should appreciate that the roller 10 can be designed in any suitable way such that the bearing 16 is fitted within the interior of the housing 18.

The bearing 16 defines also the rotational axis "A" extending through the substantial center of the faces 34, 36 of the bearing 16. Also, bringing together the parts 16A, 16B of the bearing 16 forms a hole 40 substantially uniformly extending completely through the bearing 16 substantially concentric with the rotational axis "A" and adapted to matingly receive the bushing 20. The hole 40 defines a substantially circular cross-section and opening at a substantially central area of each of the faces 34, 36 to define, as shown in FIG. 3, a substantially smooth, uniform inner circumferential surface 42 of the bearing 16 that is substantially perpendicular to the faces 34, 36 of the bearing 16.

The ends of the inner circumferential surface 42 and hole 40 of the bearing 16 combine to define, as shown in FIG. 3, a respective pair of indentations 44, each of which defines a substantially rectangular transverse cross-section. As described below, the indentations 44 are adapted to receive and support correspondingly a head 54 of the pin 12 and portion of the bushing 20. The inner diameter of the bearing 16, which is defined by the combination of the hole 40 and the inner circumferential surface 42 of the bearing 16, is greater than or equal to the depth of the hemisphere 39. The greatest distance from the outer circumferential surface 38 to the inner circumferential surface 42 of the bearing 16 is greater than or equal to the shortest distance from the outer circumferential surface 28 to the inner circumferential surface 32 of the housing 18.

Preferably, the bearing 16 is made of engineered plastic. By way of example only, the bearing 16 can be made of nylon, acetal resin, or ultra-high-molecular-weight polyethylene (UHMPE) to reduce the rate of operative wear between the bearing 16 and housing 18.

In the embodiment of the roller 10 shown, the bearing 16 is substantially split into two substantially equal halves 16A, 16B such that a predetermined amount of space is defined between adjacent ends of the respective halves 16A, 16B and adapted to receive a respective shoulder 23 of the bushing 20, which is described in more detail below. More specifically, the amount of space corresponds to a thickness of the respective shoulder 23. However, it should be appreciated by those having ordinary skill in the related art that the bearing 16 can be substantially split into any suitable number of parts. It should be so appreciated also that the predetermined amount of space defined between adjacent ends of respective parts of the bearing 16 can be any suitable amount.

It should be appreciated by those having ordinary skill in the related art that the bearing 16 can have any suitable size, shape, and structure and structural relationship with each of the housing 18 and bushing 20. It should be so appreciated also that the hole 40 can have any suitable size and shape and structural relationship with the remainder of the bearing 16. It should be so appreciated also that the bearing 16 can be made from any suitable material, in general, and plastic, in particular, to reduce the rate of operative wear between the bearing 16 and housing 18.

The bushing 20 includes a body portion, generally indicated at 22, and a washer portion 48 integrally extending from the end of the body portion 22 disposed proximate the hanger 14. More specifically, the body portion 22 is substantially cylindrical and defines a substantially circular cross-section, an outer diameter, and smooth outer circumferential surface 46. The washer portion 48 is substantially coaxial with the body portion 22 and defines an outside diameter greater than that of the body portion 22. The washer portion 48 is disposed substantially perpendicular to the outer circumferential surface 46 and adapted to be received within the indentation 44 of the bearing 16 to abuttingly engage the respective halves 16A, 16B in a substantially flush manner to, thereby, support the bearing 16 about the bushing 20. The edge joining the outer circumferential surface 46 and the washer portion 48 is substantially linear.

The bushing 20 defines also the rotational axis "A" extending through the substantial center of the bushing 20. The bushing 20 defines also an aperture 50 defining a substantially circular cross-section and opening at a substantially central area of each end of the bushing 20. The aperture 50 is adapted to matingly receive a shaft 13 of the pin 12. The aperture 50 extends entirely through the bushing 20 substantially concentric with the rotational axis "A" to define a pair of open ends and substantially smooth, uniform inner circumferential surface 52 of the bushing 20. The entire body portion 22 is matingly received within the hole 40 formed by bringing together the parts 16A, 16B of the bearing 16 such that at least a part of the washer portion 48 extends beyond face 26 of the housing 18 and space is defined between the body portion 22 and face 24 of the housing 18. Preferably, the bushing 20 is made of engineered plastic.

The body portion 20 also defines at least one shoulder 23 adapted to substantially positively abuttingly engage the parts 16A, 16B of the bearing 16 to substantially prevent rotation of the bearing 16 about the bushing 20 during rolling of the housing 18 along the track. In the embodiment of the roller 10 shown in FIG. 3, the outer circumferential surface 46 of the bushing 20 defines a pair of opposed and substantially equal and uniform shoulders 23 such that a predetermined amount of space is defined between adjacent ends of the respective shoulders 23 corresponding to a length of each half 16A, 16B of the bearing 16. Each shoulder 23 defines a substantially rectangular longitudinal cross-section and extends integrally with the outer circumferential surface 46 and from one end to the other of the body portion 22 such that the shoulder 23 is disposed substantially flush with the washer portion 48. During such rolling, the shoulders 23 substantially prevent the bearing 16 from rotating or otherwise moving—e.g., frictionally sliding, slipping, or creeping—with respect to the bushing 20.

It should be appreciated by those having ordinary skill in the related art that the outer circumferential surface 46 of the body portion 22 can define any suitable number of shoulders 23. It should be so appreciated also that the predetermined amount of space defined between adjacent ends of respective shoulders 23 of the bushing 20 can be any suitable amount. It should be so appreciated also that each shoulder 23 can have any suitable shape, size, and structure and structural relationship with each of the remainder of the bushing 20 and the bearing 16, in general, and the halves 16A, 16B, in particular.

It should be appreciated by those having ordinary skill in the related art that the bushing 20 can have any suitable size, shape, and structure and structural relationship with each of the bearing 16 and shaft 13 of the pin 12. It should be so appreciated also that each of the body portion 22 and washer portion 48 can have any suitable size, shape, and structure and structural relationship with the remainder of the bushing 20. It should be so appreciated also that the aperture 50 can have any suitable size and shape and structural relationship with the remainder of the bushing 20. It should be so appreciated also that the bushing 20 can be made from any suitable material, in general, and plastic, in particular.

The shaft 13 of the pin 12 is adapted to be matingly received within the aperture 50 of the bushing 20 such that a free end of the shaft 13 projects out and is carried by the bushing 20. In particular and as already described, the roller 10 can be designed such that, during operation of the trolley assembly, as the housing 18 rolls along the track, the housing 18 operatively moves relative to the bearing 16 and, thus, bushing 20 and pin 12. In this case, the shaft 13 of the pin 12 is press-fitted, slip-fitted, or otherwise fitted within the aperture 50. In this way, the shaft 13 abuttingly engages the inner circumferential surface 52 of the bushing 20 such that the pin 12 does not frictionally slide, slip, or creep with respect to the bushing 20. Preferably, the pin 12 is a standard mechanical fastener and made of stainless steel. By way of example only, the pin 12 can be a socket-head-cap screw. Those having ordinary skill in the related art should appreciate that the pin 12 can have any suitable shape, size, and structure and structural relationship with the bushing 20 and be made of any suitable material.

In the embodiment of the roller 10 shown, the pin 12 defines a pinhead 54, which is solid and substantially circular, defines the rotational axis "A" and closes the side of the roller 10, in general, and the aperture 50 of the bushing 20, in particular, located opposite the hanger 14. The pinhead 54 is disposed substantially flush with and acts as part of face 24 of the housing 18 to prevent entry of contaminants into the housing 18. More specifically, the pinhead 54 is disposed in abutting engagement with the end of the body portion 22 of the bushing 20 disposed opposite the washer portion 48 to give the combination of the bushing 20 and pinhead 54 an "I" shaped cross-section. As shown in the figures, no portion of the pinhead 54 extends beyond face 24 of the housing 18. However, those having ordinary skill in the related art should appreciate that the pinhead 54 can have any suitable shape, size, and structure and structural relationship with each of the remainder of the pin 12, aperture 50, bushing 20, housing 18, and/or bearing 16. For instance, a portion of the pinhead 54 can extend beyond face 24 of the housing 18.

Referring now to FIGS. 7 through 11, structure of the roller 110 will be addressed. Parts of the roller 110 corresponding to those of the roller 10 have like reference numerals with respect to the roller 10, but increased by one hundred (100).

Figure 11:
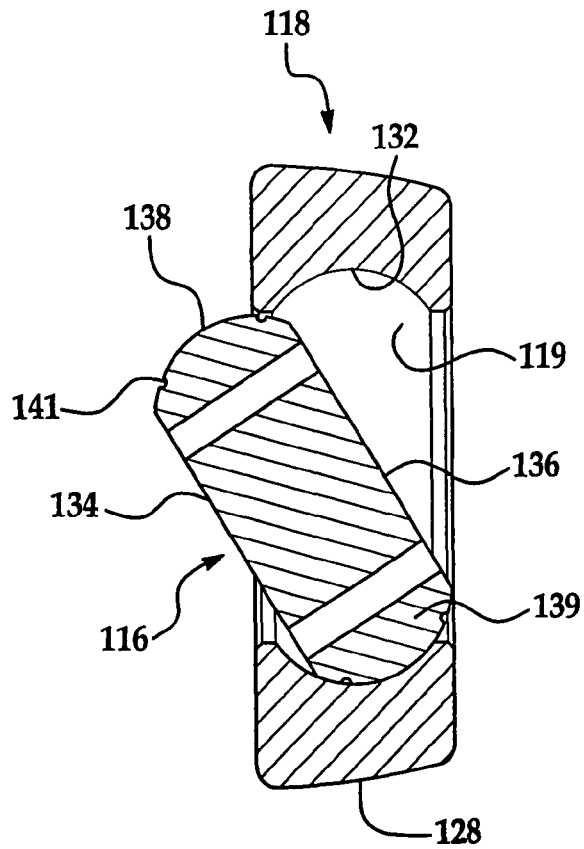
FIG. 11 is a cross-sectional side view showing assembly/disassembly of the bearing with respect to the housing of the embodiment of the roller for a trolley assembly of the invention illustrated in FIG. 7.

In this embodiment, the bearing 116 is substantially donut-shaped to define, as shown in FIG. 11, a pair of opposed and substantially identical ring-like faces 134, 136, respectively, that are spaced substantially parallel with each other. The faces 134, 136 are disposed slightly inset from the corresponding faces 124, 126 of the housing 118 and define a diameter of the faces 134, 136 smaller than or equal to that of the bore 130 of the housing 118. The bearing 116 defines also a substantially uniform, smooth, dome-shaped outer circumferential surface 138 disposed integrally with and between and about the faces 134, 136 of the bearing 116 to define a thickness of the bearing 116 smaller than or equal to that of the housing 118 such that the bearing 116 is housed completely within the bore 130 (including the race 119) of the housing 118.

More specifically, the transverse cross-section of the bearing 116 defines, as shown in FIG. 11, a substantially solid hemisphere 139 such that the outer circumferential surface 138 is convex with respect to the rotational axis "A" of the bearing 116. The hemisphere 139 extends from face 134 to face 136 of the bearing 116 and is adapted to be nestingly received within the race 119. The edges joining the outer circumferential surface 138 and the respective faces 134, 136 can be either arcuate or linear. The roller 110 can be designed such that, as shown in FIG. 11, the bearing 116 is adapted to be inserted—particularly, snap-fitted—within the bore 130 of the housing 118 such that, during operation of the trolley assembly, as the housing 118 rolls along the track, the housing 118 operatively moves relative to the bearing 116 and, thus, bushing 120 and pin 12.

To this end, the housing 118 is adapted to be heated to, say, 150° C. to expand the diameter of the bore 130 of the housing 118 by a predetermined distance—for example, 0.35 mm—to ease assembly of the bearing 116 within the bore 130. In this case, such assembly requires, for instance, a 1.2-mm snap. However, it should be appreciated by those having ordinary skill in the related art that the roller 110 can be designed in any suitable way such that the bearing 116 is fitted within the bore 130 of the housing 118. It should be so appreciated also that the housing 118 can be heated to any suitable temperature to expand the diameter of the bore 130 of the housing 118 by any suitable distance to ease assembly of the bearing 116 within the bore 130. It should be so appreciated also that such assembly can require a snap of any suitable distance.

The outer circumferential surface 138 defines also at least one groove 141 extending on the outer circumferential surface 138 and adapted to receive and carry contamination resulting from use of the trolley assembly. Preferably, the outer circumferential surface 138 defines a plurality of grooves 141, some of which extend along the outer circumferential surface 138 completely about the bearing 116 substantially parallel with each other and some of which extend across the outer circumferential surface 138 from face 134 to face 136 substantially parallel with and equidistantly spaced with respect to each other and perpendicular to those that extend along the outer circumferential surface 138. It should be appreciated by those having ordinary skill in the related art that the outer circumferential surface 138 can define any suitable number of grooves 141. It should be so appreciated also that each groove 141 can have any suitable shape and size and structural relationship with the outer circumferential surface 138. It should be so appreciated also that the outer circumferential surface 138 of the bearing 116 can define no grooves 141, and, instead, the race 119, in general, and the inner circumferential surface 132, in particular, of the housing 118 can define the at least one groove 141 as described above. It should be so appreciated also that a combination of the outer circumferential surface 138 of the bearing 116 and inner circumferential surface 132 of the housing 118 can define the at least one groove 141. It should be so appreciated also that the roller 110 can define no grooves 141.

The bearing 116 defines also the rotational axis "A" extending through the substantial center of the faces 134, 136 of the bearing 116. Also, bringing together the parts 116A, 116B of the bearing 116 defines a hole 140 substantially uniformly extending completely through the bearing 116 substantially concentric with the rotational axis "A" and adapted to matingly receive the bushing 120. The hole 140 defines a substantially non-circular cross-section and opening at a substantially central area of each of the faces 134, 136 to define, as shown in FIG. 10, a substantially smooth, uniform inner perimeter surface 142 of the bearing 116 that is substantially perpendicular to the faces 134, 136 of the bearing 116. In the embodiment shown, the hole 140 defines a substantially non-circular cross-section and opening.

The ends of the inner perimeter surface 142 and hole 140 of the bearing 116 combine to define, as shown in FIG. 10, a substantially rectangular transverse cross-section. As described below, the inner perimeter surface 142 and hole 140 are adapted to receive and support a portion of the bushing 120.

Preferably, the bearing 116 is made of engineered plastic. By way of example only, the bearing 116 can be made of nylon, acetal resin, or ultra-high-molecular-weight polyethylene (UHMPE) to reduce the rate of operative wear between the bearing 116 and housing 118.

In the embodiment of the roller 110 shown, the bearing 116 is split into two substantially equal halves 116A, 116B such that a predetermined amount of space is defined between adjacent ends of the respective halves 116A, 116B and that corresponds to a thickness of the bushing 120. However, it should be appreciated by those having ordinary skill in the related art that the bearing 116 can be split into any suitable number of parts. It should be so appreciated also that the predetermined amount of space defined between adjacent ends of respective parts of the bearing 116 can be any suitable amount.

It should be appreciated by those having ordinary skill in the related art that the bearing 116 can have any suitable size, shape, and structure and structural relationship with each of the housing 118 and bushing 120. It should be so appreciated also that the hole 140 can have any suitable size and non-circular cross-sectional shape and structural relationship with the remainder of the bearing 116. It should be so appreciated also that the bearing 116 can be made from any suitable material, in general, and plastic, in particular. It should be so appreciated also that the outer circumferential surface 138 of the bearing 116 can be made of any suitable material, in general, and resin, in particular, to reduce the rate of operative wear between the bearing 116 and housing 118.

The bushing 120 includes a body portion, generally indicated at 122, and a washer portion 148 integrally extending from the end of the body portion 122 disposed proximate the hanger 14. More specifically and as shown in FIG. 10, the body portion 122 is substantially cylindrical and defines a substantially non-circular cross-section and smooth outer perimeter surface 146. In the embodiment shown, the body portion 122 defines a substantially rectangular cross-section. The washer portion 148 is substantially coaxial with the body portion 122 and defines an outside diameter greater than the width and depth of the body portion 122. The washer portion 148 is disposed substantially perpendicular to the outer perimeter surface 146 and adapted to abuttingly engage the respective halves 116A, 116B of the bearing 116 in a substantially flush manner to, thereby, support the bearing 116 about the bushing 120. The edge joining the outer perimeter surface 146 and the washer portion 148 is substantially linear.

The bushing 120 defines also the rotational axis "A" extending through the substantial center of the bushing 120. The bushing 120 defines also an aperture 150 defining a substantially circular cross-section and opening at a substantially central area of each end of the bushing 120. The aperture 150 is adapted to matingly receive the shaft 13 of the pin 12. As shown in FIG. 10, the aperture 150 extends entirely through the bushing 120 substantially concentric with the rotational axis "A" to define a pair of open ends and substantially smooth, uniform inner circumferential surface 152 of the bushing 120. The entire body portion 122 is matingly received within the hole 140 formed by bringing together the parts 116A, 116B of the bearing 116 such that at least a part of the washer portion 148 extends beyond face 126 of the housing 118 and space is defined between the body portion 122 and face 124 of the housing 118. Preferably, the bushing 120 is made of engineered plastic.

The sides of the outer perimeter surface 146 of the body portion 122 are adapted to substantially positively abuttingly engage the corresponding sides of the inner perimeter surface 142 of the respective parts 116A, 116B of the bearing 116 to substantially prevent rotation of the bearing 116 about the body portion 122 during rolling of the housing 18 along the track. More specifically, during such rolling, the "rectangularity" substantially prevents the bearing 116 from rotating or otherwise moving—e.g., frictionally sliding, slipping, or creeping—with respect to the body portion 122 of the bushing 120.

It should be appreciated by those having ordinary skill in the related art that the bushing 120 can have any suitable size, shape, and structure and structural relationship with each of the bearing 116 and shaft 13 of the pin 12. It should be so appreciated also that each of the body portion 122 and washer portion 148 can have any suitable size, shape, and structure and structural relationship with the remainder of the bushing 120. It should be so appreciated also that each of the outer perimeter surface 146 of the bushing 120 and hole 140 of the bearing 116 can define any suitably shaped non-circular cross-section such that when the body portion 122 is matingly received within the hole 140, the bearing 116 is substantially prevented from rotating or otherwise moving with respect to the body portion 122. It should be so appreciated also that the aperture 150 can have any suitable size and shape and structural relationship with the remainder of the bushing 120. It should be so appreciated also that the bushing 120 can be made from any suitable material, in general, and plastic, in particular.

The shaft 13 of the pin 12 is adapted to be matingly received within the aperture 150 of the bushing 120 such that a free end of the shaft 13 projects out and is carried by the bushing 120. In particular and as already described, the roller 110 can be designed such that, during operation of the trolley assembly, as the housing 118 rolls along the track, the housing 118 operatively moves relative to the bearing 116 and, thus, bushing 120 and pin 12. In this case, the shaft 13 of the pin 12 is press-fitted, slip-fitted, or otherwise fitted within the aperture 150. In this way, the shaft 13 abuttingly engages the inner circumferential surface 152 of the bushing 120 such that the pin 12 does not frictionally slide, slip, or creep with respect to the bushing 120. Preferably, the pin 12 is made of stainless steel.

It should be appreciated by those having ordinary skill in the related art that the pin 12 can have any suitable shape, size, and structure and structural relationship with the bushing 120 and be made of any suitable material. It should be so appreciated also that a socket-head-cap screw or other standard mechanical fastener can be employed as the pin 12.

In the embodiment of the roller 110 shown, the pin 12 defines a pinhead 54, which is solid and substantially circular, closes the side of the roller 110, in general, and the aperture 150 of the bushing 120, in particular, located opposite the hanger 14 to prevent entry of contaminants into the housing 118. A washer 164 can be sandwiched between the pinhead 54 and face 134 of the bearing 116. Each of the pinhead 54 and aperture 150 defines the rotational axis "A." The washer 164 is adapted to retain the bearing 116.

More specifically, the washer 164 is disposed in abutting engagement with the end of the body portion 122 of the bushing 120 disposed opposite the washer portion 148 to give the combination of the bushing 120 and pinhead 54 an "I" shaped cross-section. As shown in the figures, no portion of the washer 164 extends beyond face 124 of the housing 118. The pinhead 54, on the other hand, extends beyond face 124 by a distance substantially equal to the distance that the washer portion 148 extends beyond face 126 of the housing 118. However, those having ordinary skill in the related art should appreciate that each of the pinhead 54 and washer 164 can have any suitable shape, size, and structure and structural relationship with the other and aperture 150, bushing 120, housing 118, and/or bearing 116. For instance, a portion of the pinhead 54 can extend beyond face 124 of the housing 118.

It should be appreciated by those having ordinary skill in the related art that the roller 10 shown in FIG. 4 can include also a washer and/or the elements of the roller 10 can be arranged differently with respect to each other than they are shown so arranged in the figure. In particular, the bushing 20 can be disposed between the pin 12 and the housing 18 in the figure with a washer (not shown) disposed between the pin 12 and the bushing 20. It should be so appreciated also that the elements of the roller 110 shown in FIG. 10 can be arranged differently with respect to each other than they are shown so arranged in the figure. In particular, the bushing 120 can be disposed between the pin 12 and the housing 18 in the figure with the washer 164 disposed between the housing 118 and the bearing 116.

Figure 7:
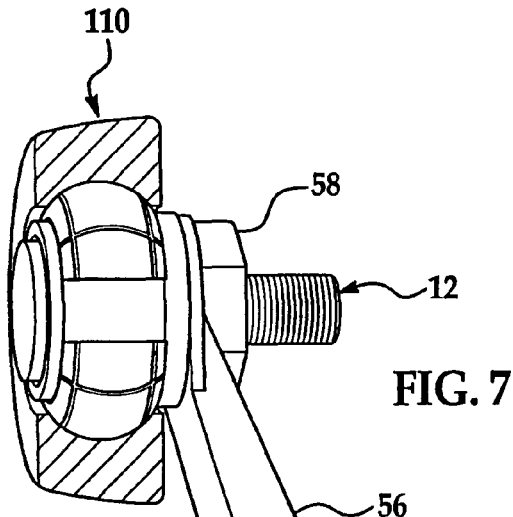
FIG. 7 is a partial environmental view of a second embodiment of the roller for a trolley assembly of the invention with the housing thereof viewed in cross-section.
Figure 8:
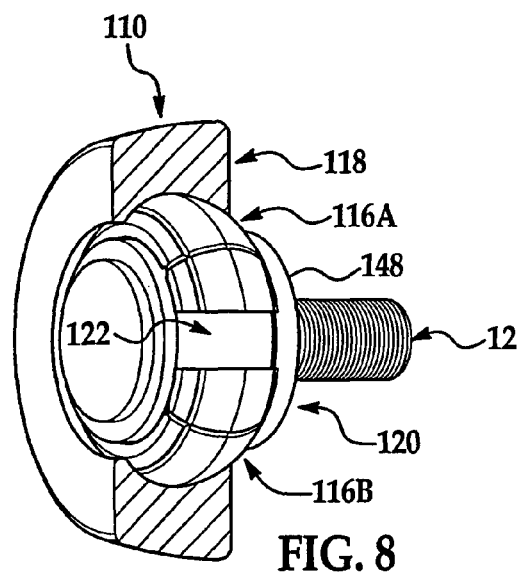
FIG. 8 is a perspective view of the embodiment of the roller for a trolley assembly of the invention illustrated in FIG. 7 with the housing thereof viewed in cross-section.
Figure 9:
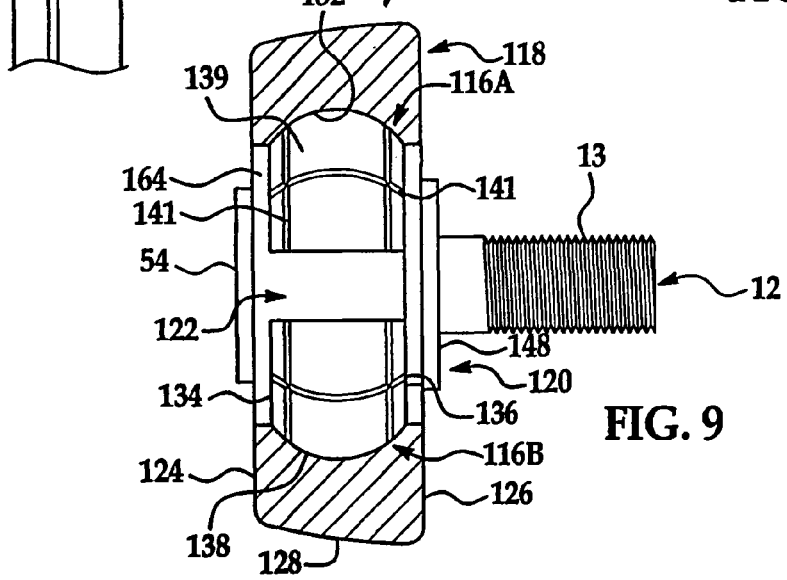
FIG. 9 is a side view of the embodiment of the roller for a trolley assembly of the invention illustrated in FIG. 7 with the housing thereof viewed in cross-section.

As shown in each of FIGS. 1 and 7, each hanger 14, which forms no part of the invention, generally is made of steel or other suitable material and includes a cylindrical upper portion 56 defining an aperture (not shown) therethrough for matingly receiving the free end of the shaft 13 of the pin 12. A nut 58 is tightened onto the free end of the shaft 13 to clamp the upper portion 56 between the nut 58 and the washer portion 48, 148 of the bushing 20, 120 in a substantially flush manner. The hanger 14 includes also a linear intermediate portion 60 extending downwardly from the bottom of the upper portion 56 such that, in combination of the hangers 14, the intermediate portions 60 thereof angle inwardly toward one another. The hanger 14 includes also a linear lower portion 62 extending downwardly from the bottom of the intermediate portion 60 such that, in combination of the hangers 14, the lower portions 62 thereof are disposed spaced and substantially parallel with each other. At least one carrier plate (not shown) is sandwiched between and extends downwardly from the lower portions 62. The lower portions 62 and carrier plate are clampingly connected together by at least one bolt-and-nut combination (not shown). An aperture (not shown) is defined through a free end of the carrier plate for receipt thereby of a hook member (not shown) or the like for use thereby in transporting the load.

A split half of a link (not shown) of a conveyor chain (not shown) is positioned in a notch (not shown) defined in the lower portion 62 of each hanger 14 to embrace and drivingly engage the hanger 14. Powered movement of the chain in a known manner serves to move the trolley assembly along the track to move the load carried by the carrier plate from point to point within the facility.

In operation of the roller 10, 110, the hemisphere 39, 139 of the bearing 16, 116 reduces or even prevents wear between the housing 18, 118 and the bearing 16, 116 via the constant downward force applied by the load to the roller 10, 110 over time such that the roller 10, 110 does not tend to prematurely fail. More specifically, the hemisphere 39, 139 provides greater amount of arc, which, in turn, results in less amount of moment and/or radial load per unit area of the bearing 16, 116. The greater arc results in also distribution of load over more area of the bearing 16, 116, which, in turn, substantially avoids "edge loading." Also in operation of the roller 10, 110, the bushing 20, 120 substantially prevents the bearing 16, 116 from rotating about—frictionally sliding, slipping, or creeping with respect to—the bushing 20, 120.

The all-plastic design of the roller 10, 110 makes the roller 10, 110 relatively lighter and cost-effective. Such design also, in combination with the stainless steel pin 12, makes the roller 10, 110 easier to clean, especially in a heavy-water/heavy-solvent environment. The roller 10, 110 also can use an existing hanger 14.

The roller 10, 110 does not tend to prematurely fail. Also, the housing 18, 118 does not unevenly wear with respect to the bearing 16, 116 during operation of the trolley assembly. And, the roller 10, 110 can be manufactured more cheaply and easily and, thus, more cost-effectively relative to the trolley assemblies of the related art. Furthermore, the roller 10, 110 is more durable and better distributes load to parts of the roller 10, 110 relative to the trolley assemblies of the related art. In addition, the roller 10, 110 is easier to clean and more resistant to contamination and corrosion relative to the trolley assemblies of the related art. Moreover, the roller 10, 110 can find special application in a heavy-water/heavy-solvent environment, especially in the food-processing or service industry. Plus, the roller 10, 110 is lighter relative to the trolley assemblies of the related art. The roller 10, 110 can be used in connection with an existing hanger of the trolley assembly as well.

The roller 10, 110 has been described in an illustrative manner. It is to be understood that the terminology that has been used is intended to be in the nature of words of description rather than of limitation. Many modifications and variations of the roller 10, 110 are possible in light of the above teachings. Therefore, within the scope of the appended claims, the roller 10, 110 may be practiced other than as specifically described.

What is claimed is:

1. A roller for a trolley assembly, which includes at least one track and at least one pin adapted to carry a hanger, said roller comprising:

a bearing substantially split to define at least two independent parts of said split bearing;

a housing that rollingly engages along the at least one track and houses said bearing; and a bushing that is housed within said housing, carries the pin, supports said bearing about said bushing, and defines at least one shoulder adapted to substantially positively abuttingly engage said at least two parts of said bearing to substantially prevent rotation of said bearing about said bushing during rolling of the housing along the at least one track.

2. A roller for a trolley assembly as set forth in claim 1, wherein the pin is adapted to be matingly received within said bushing such that operative displacement among said bearing and bushing and the pin relative to each other is substantially prevented and said housing is operatively rotatable relative to said bearing and, thus, bushing and the pin to allow said housing to roll along the at least one track.

3. A roller for a trolley assembly as set forth in claim 1, wherein a predetermined amount of space is defined between adjacent ends of said respective at least two parts of said bearing and adapted to receive respective said at least one shoulder of said bushing.

4. A roller for a trolley assembly as set forth in claim 3, wherein said bearing defines a pair of said parts and said bushing defines a pair of said shoulders such that a predetermined amount of space is defined between adjacent ends of respective said pair of shoulders corresponding to a length of respective said pair of said parts of said bearing.

5. A roller for a trolley assembly as set forth in claim 1, wherein said bearing defines an oversized, arcuate transverse cross-section.

6. A roller for a trolley assembly as set forth in claim 1, wherein said housing defines a bore of said housing and said bearing is adapted to be snap-fitted within said bore.

7. A roller for a trolley assembly as set forth in claim 6, wherein said bore of said housing defines a diameter and said housing is adapted to be heated to expand said diameter by a predetermined distance to ease assembly of said bearing within said bore.

8. A roller for a trolley assembly as set forth in claim 1, wherein said housing, bearing, and bushing are made of engineered plastic.

9. A roller for a trolley assembly as set forth in claim 8, wherein said housing is made of nylon, acetal resin, and UHMPE to reduce the rate of operative wear between said bearing and housing.

10. A roller for a trolley assembly as set forth in claim 8, wherein said bearing is made of any of nylon, acetal resin, and UHMPE to reduce the rate of operative wear between said bearing and housing.

11. A roller for a trolley assembly as set forth in claim 1, wherein the pin is a socket-head-cap screw.

12. A roller for a trolley assembly as set forth in claim 1, wherein the pin is made of stainless steel.

13. A roller for a trolley assembly, which includes at least one track and at least one pin adapted to carry a hanger, said roller comprising:

a bearing substantially split to define at least two independent parts of said split bearing and defining a hole of said bearing that defines a substantially non-circular cross-section;

a housing that rollingly engages along the at least one track and houses said bearing; and a bushing that defines a substantially non-circular cross-section, is housed within said housing, carries the pin, supports said bearing about said bushing, and is matingly received by said hole of said bearing to substantially prevent rotation of said bearing about said bushing during rolling of said housing along the at least one track.

14. A roller for a trolley assembly as set forth in claim 13, wherein said hole of said bearing and said bushing define a substantially rectangular cross-section.

15. A roller for a trolley assembly as set forth in claim 13, wherein said roller further includes a washer sandwiched between the pin and said bearing and adapted to retain said bearing.

16. A roller for a trolley assembly, which includes at least one track and at least one pin adapted to carry a hanger, said roller comprising:
- a bearing substantially split to define at least two independent parts of said split bearing;
- a housing that rollingly engages along the at least one track, houses said bearing, and includes a race adapted to nestingly receive said bearing; and
- a bushing that is housed within said housing, carries the pin, supports said bearing about said bushing, and substantially positively abuttingly engages said at least two parts of said bearing to substantially prevent rotation of said bearing about said bushing during rolling of said housing along the at least one track, wherein said bearing defines a substantially hemispheric cross-section and is adapted to be nestingly received within said race of said housing.

* * * * *